United States Patent [19]

Hirano et al.

[11] Patent Number: 5,437,751
[45] Date of Patent: Aug. 1, 1995

[54] METHOD OF PRODUCING PNEUMATIC RADIAL TIRES WITH A RUBBER SHEET OVER OVERLAPPED CARCASS EDGE PORTIONS

[75] Inventors: Shinichi Hirano, Kawagoe; Tsuneharu Akiyama, Akishima, both of Japan

[73] Assignee: Bridgestone Corporation, Tokyo, Japan

[21] Appl. No.: 918,125

[22] Filed: Jul. 23, 1992

Related U.S. Application Data

[63] Continuation of Ser. No. 767,356, Sep. 30, 1991, abandoned, which is a continuation of Ser. No. 547,254, Jul. 3, 1990, abandoned.

[30] Foreign Application Priority Data

Jul. 4, 1989 [JP] Japan .................. 1-171236
Jun. 5, 1990 [JP] Japan .................. 2-145498

[51] Int. Cl.⁶ .......................... B60C 9/02; B29D 30/06
[52] U.S. Cl. ...................... 156/134; 152/548
[58] Field of Search ............... 156/133, 134; 152/542, 152/548, 555, 560, 564, 547

[56] References Cited

U.S. PATENT DOCUMENTS

| | | | |
|---|---|---|---|
| 3,980,606 | 9/1976 | Werner | 152/564 |
| 4,185,675 | 1/1980 | Greiner et al. | 152/555 |
| 4,466,473 | 8/1984 | Matyja et al. | |
| 4,810,317 | 3/1989 | Lang | 156/134 |
| 5,062,462 | 11/1991 | Rye et al. | 152/548 |

FOREIGN PATENT DOCUMENTS 0239160 9/1987 European Pat. Off.

*Primary Examiner*—Geoffrey L. Knable
*Attorney, Agent, or Firm*—Sughrue, Mion, Zinn, Macpeak & Seas

[57] ABSTRACT

An uneven appearance at a sidewall face of a pneumatic radial tire is improved by arranging a particular rubber containing no reinforcing cords sheet onto an outer face of an overlap portion of a carcass material or between opposed edge portions of the carcass material to be overlapped.

5 Claims, 6 Drawing Sheets

FIG_8a
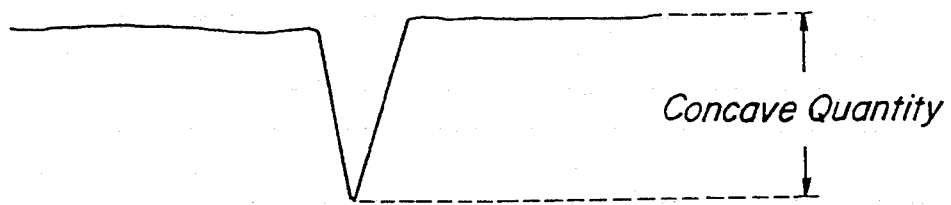
Concave Quantity
FIG_8b
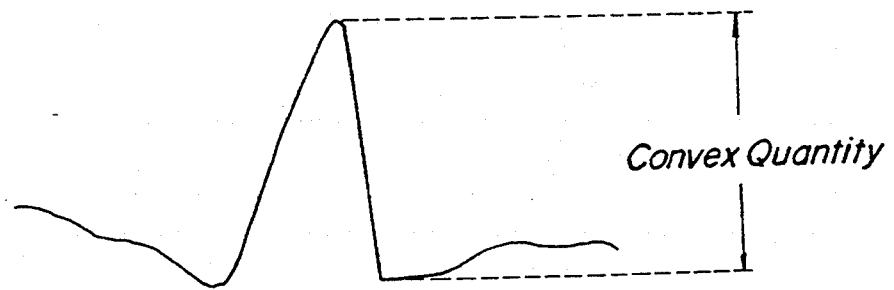
Convex Quantity

METHOD OF PRODUCING PNEUMATIC RADIAL TIRES WITH A RUBBER SHEET OVER OVERLAPPED CARCASS EDGE PORTIONS

This is a continuation of application Ser. No. 07/767,356 filed on Sep. 30, 1991 how abandoned, which is a continuation of U.S. Pat. No. 07/547,254 filed Jul. 3, 1990 now abandoned.

BACKGROUND OF THE INVENTION

1. Field of the Invention

This invention relates to pneumatic radial tires and a method of producing the same, and more particularly to an improvement of an uneven appearance in a sidewall face of the product tire.

2. Related Art Statement

Recently, tires are strongly directed to achieve high grade and high performance. To these ends, the demand for improving the appearance is ever increasing in addition to the improvement of running performances and durability performance.

In pneumatic radial tires for passenger cars and small size trucks, organic fibers such as rayon, nylon, polyester and the like are mainly used as a cord for the carcass ply. The use of such fibers in the carcass ply is generally carried out by the following method.

That is, the above fibers are twisted every 2 to 3 fibers while a constant twisting is applied to each of these fibers, whereby plural cords are obtained as a warp. Then, these cords are aligned and a fine and weak weft yarn is roughly driven in a direction perpendicular to the warp to form a tire cord fabric, which is subjected to an adhesive treatment for adhering to rubber. Thereafter, such a cord fabric is covered with a topping rubber at a constant thickness to form a rubberized cord fabric.

Next, the rubberized cord fabric is cut so that the warp has a constant length and the opposed edge portions of the cut cord fabrics other than the cut face are joined to each other to form a carcass material for radial tires.

In tire building, the above carcass material is cut on a tire-building drum (or similar equipment) in the same direction as the warp and joined at the cut ends into a cylindrical shape. Then, bead cores, belt, sidewall rubbers, tread rubber and the like are attached thereto, which are vulcanized to obtain a tire product.

In the joining step among the above steps, the opposed edge portions of the cord fabrics cut at a constant length in a direction perpendicular to the warp are overlapped to each other in the same direction as the warp on the building drum, so that the number of cords in the overlap portion is two times than that in the other portion (see FIG. 4a).

When internal pressure is applied to the tire product, the tensile modulus of the overlap portion becomes twice as great, so that the cords in the overlap portion hardly elongate. As a result, such an overlap portion forms a depression as an appearance of the tire product when the tire is inflated under a given internal pressure. When the depression amount is not more than about 1 mm, the depression is quiet, while when it exceeds 1 mm, the problem is raised as a commercial value. Recently, a case has been noted where the depression amount exceeding 0.5 mm is claimed as a tire appearance issue in the market. Therefore, various countermeasures for solving this problem have been attempted in the art. For example, there is proposed a technique wherein the cord used in the overlap portion has a modulus of elasticity lower than that in the other portion. Another technique proposed has the cords in one of the edge portions to be overlapped are cut at one or more positions to tensionly act the overlap portion as a single ply other techniques propose raising the modulus of elasticity of the cords as a whole, and having the edge portions joined to each other without overlapping, and the like.

However, all of the conventionally proposed techniques do not sufficiently solve the above problems.

In the technique of reducing the modulus of elasticity in the cord of the overlap portion, the improving effect of the overlap portion is developed at the cutting step of the rubberized cord fabric, but the opposed edge portions of the cut cord fabrics are not necessarily overlapped with each other at the tire building step, so that the improving effect as a whole of the tire product is insufficient. In this case, the low modulus cords are required to be arranged in only the overlap portion, so that it is difficult to control such an arrangement. If the low modulus cords are arranged in a portion separated away from the overlap portion, these cords rather elongate in a convex direction in the inflation of internal pressure, which raises a problem with respect to the durability in the tire comprising solely a carcass type material.

The technique of cutting the cords in one of the edge portions to be overlapped has similar problems. Furthermore, if it is intended to conduct this technique with a high accuracy, the reduction of productivity becomes conspicuous, so that there is still a problem in practical use.

In the technique of raising the modulus of elasticity in the cord as a whole, the depression tends to decrease in the overlap portion. As the method of raising the modulus of elasticity of the synthetic fiber cord, there is generally adopted a process of increasing the tension applied to the cord during the heat treatment. However, when such a process is conducted, the heat shrinkage of the cord too rises, which badly affects the shape stability, uniformity and the like of the tire, so that it can not be said that this method is a sufficient means.

Among the conventional techniques, the butt joining of cords without overlapping is a best method, but it is not put into practical use at the present because fine cords made from the organic fiber are used as a carcass material in tires for passenger cars or small size light trucks.

SUMMARY OF THE INVENTION

It is, therefore, an object of the invention to solve the aforementioned problems of the conventional techniques and to provide pneumatic radial tires having an improved uneven appearance at sidewall faces thereof.

The inventors have made detailed analysis on the unevenness in the sidewall portion face of the tire (mainly concave state) produced at the overlap region of opposed cut edge portions of the rubberized organic fiber cord ply used as a carcass material of the radial tire and obtained the following knowledge.

That is, the unevenness produced at the sidewall portion face of the radial tire has been confirmed to result from the fact that the load bearing ratio per one cord is different between the overlap portion of the carcass material and the remaining portion thereof when internal pressure is applied to the tire. Hence the elongation of the cord under loading becomes different therebetween from a fixed portion of bead core to the other fixed portion to produce the difference in the cord length. Concretely, such a phenomenon is caused in post cure inflation (PCI) generally conducted after the vulcanization and fixed as the difference in the cord length, which is observed when the internal pressure is applied to the tire. On the other hand, it has been confirmed in case of tires not subjected to PCI that the difference in the cord length is caused by heat generation during running and other input factors after the manufacture of the tire to finally generate the unevenness.

Now, the inventors have made various studies with respect to means for reducing the difference in the cord length between the overlap portion and the remaining portion of the carcass material and found that when a particular rubber sheet is arranged between an overlap portion of the carcass material and a bead core, this sheet acts as a cushion member under the inflation of internal pressure to move the cords in a direction of from the bead core toward the belt. As a result, it has been found that as the cord length extending between the bead cores, the cords in the overlap portion contacting with the rubber sheet stretch in the longitudinal direction, whereby the ununiformization against the cord length of cords in the remaining portion of the carcass material other than the overlap portion is solved to improve the appearance in the sidewall face of the tire under inflation of given internal pressure.

That is, the invention is based on the above knowledge and lies in a method of producing a pneumatic radial tire having an improved appearance at its sidewall face to minimize unevenness and comprising a carcass of at least one radial carcass ply containing rubberized organic fiber cords radially extending between a pair of bead cores through a tread portion, characterized in that a vulcanizable rubber sheet containing no reinforcing cords having a width of 5–80 mm, a thickness of not more than 1.5 mm and a tensile modulus at 100% elongation after vulcanization of not more than 80 kg/cm$^2$ is arranged on an outer face of an overlap portion produced by piling opposed cut edge portions of the carcass ply one upon the other or between the opposed cut edge portions to be overlapped, and then vulcanization is carried out after the tire building.

BRIEF DESCRIPTION OF THE DRAWINGS

The invention will be described with reference to the accompanying drawings, wherein:

FIG. 1b is a schematically half sectional view of the radial tire using the rubber sheet shown in FIG. 1a;

FIG. 2b is a schematically half sectional view of the radial tire using the rubber sheet shown in FIG. 2a;

FIGS. 8a and 8b are charts of concave and convex quantities measured on sidewall face of the tire, respectively.

DESCRIPTION OF THE PREFERRED EMBODIMENTS

Figure 4A:
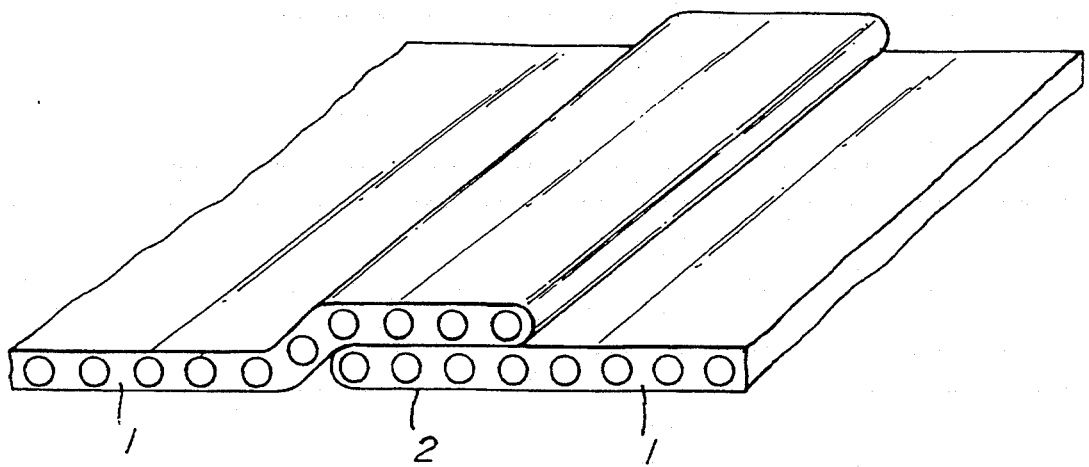
FIG. 4a is a schematic view illustrating overlapped state of the conventional carcass material.
Figures 4B, 4C:
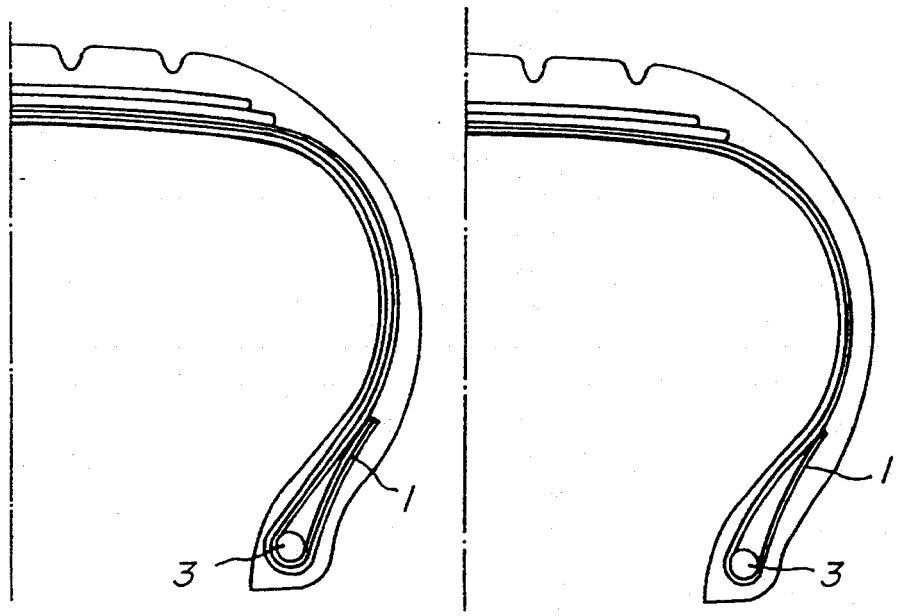
FIGS. 4b and 4c are schematically half sectional views of the radial tire using the conventional carcass material, respectively.

In tire building, the overlap portion between opposed cut edge portions of the carcass material comprised of rubberized organic fiber cords has generally a structure that both edge portions of a carcass material 1 are overlapped with each other (shown by numeral 2) as shown in FIG. 4a. The tire using the above carcass material 1 has a structure in section where the carcass material 1 is wound around a bead core 3 at the overlap portion 2 in the form of two layers as shown in FIG. 4b, while the remaining portion of the carcass material 1 other than the overlap portion is wound around the bead core 3 in form of a single layer as shown in FIG. 4c.

Figure 1A:
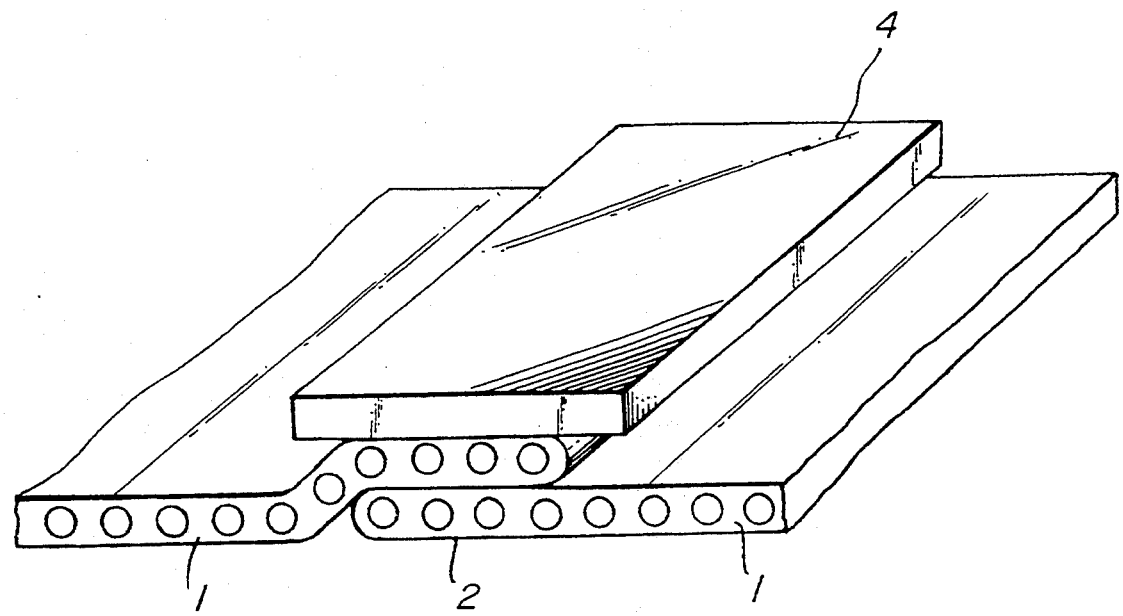
FIG. 1a is a schematic view of a first embodiment illustrating an application of a rubber sheet to an overlap portion of a carcass material according to the invention.
Figure 1B:
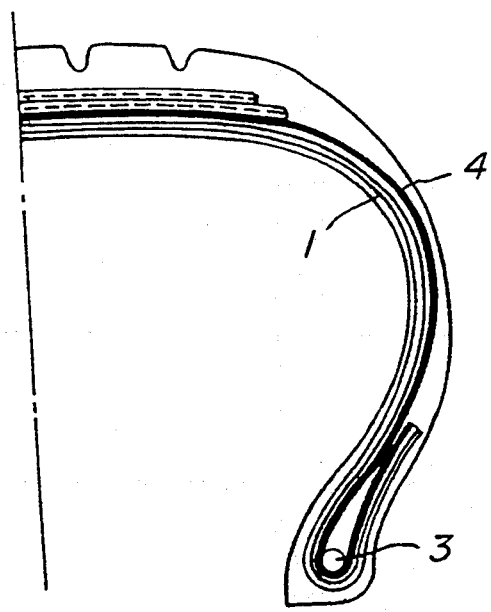

In a first embodiment of the invention, a rubber sheet 4 containing no reinforcing cords is arranged on an outer face of the overlap portion 2 so as to cover the overlap portion in a widthwise direction thereof as shown in FIG. 1a. In this case, the tire has a structure in section at the overlap portion as shown in FIG. 1b.

Moreover, the material of the rubberized organic fiber cord is not critical, but it is preferably polyethylene terephthalate.

Figure 2A:
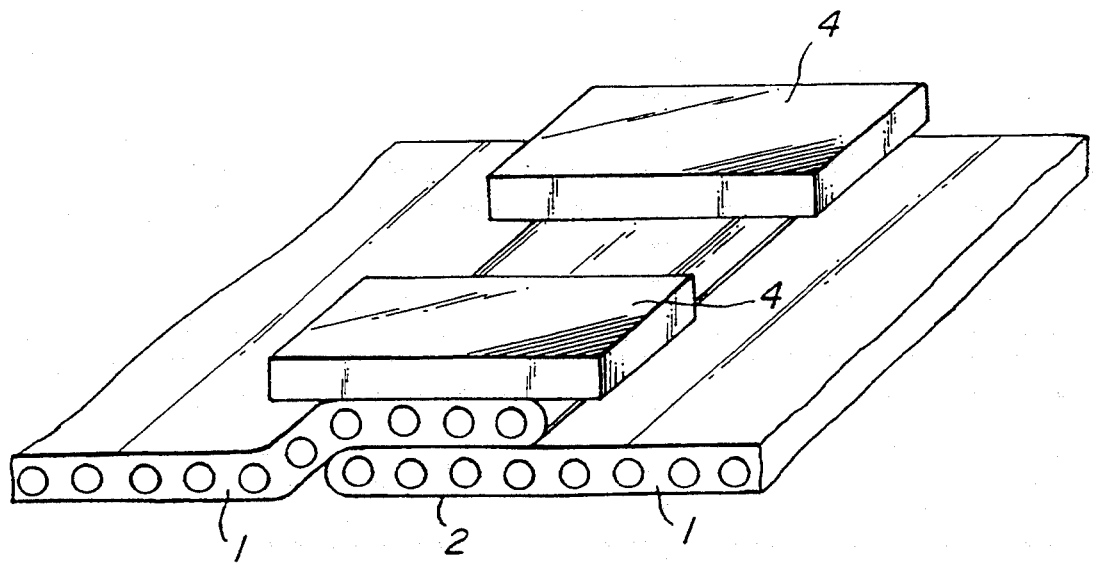
FIG. 2a is a schematic view of a second embodiment illustrating an application of a rubber sheet to an overlap portion of a carcass material according to the invention.
Figure 2B:
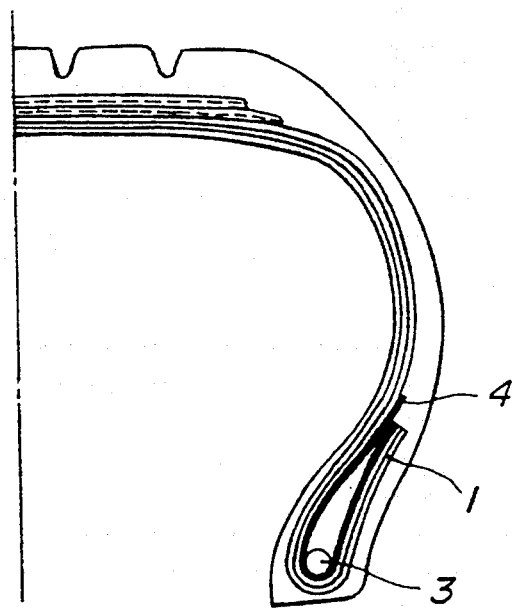

In a second embodiment of the invention, a rubber sheet 4 is arranged on the outer face of the overlap portion 2 only at a position corresponding to the outskirts of the bead core 3. In this case, the rubber sheet 4 is arranged so that the turnup end of the rubber sheet is at the same level as the upper end of the bead portion as shown in FIG. 2b.

Figure 3A:
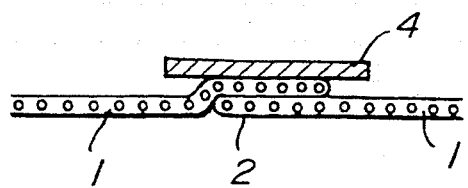
FIGS. 3a to 3d are partial sectional views of various embodiments illustrating an application of a rubber sheet to an overlap portion of a carcass material according to the invention, respectively.
Figure 3B:
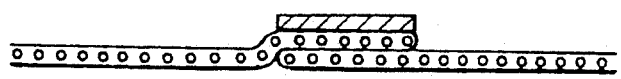
Figure 3C:
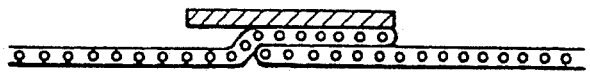
Figure 3D:
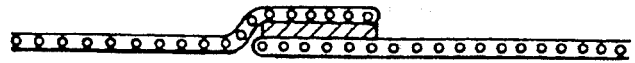
Figure 5:
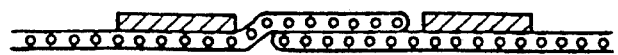
FIG. 5 is a partial sectional view of a comparative example illustrating an application of a rubber sheet to an overlap portion of a carcass material.

According to the invention, the rubber sheet 4 may be arranged on the outer face of the overlap portion 2 at various states as shown in FIGS. 3a to 3c. Similarly, the improving effect of reducing uneven appearance can be developed by interposing the rubber sheet 4 between the opposed edge portions of the carcass material 1 to be overlapped as illustrated in FIG. 3d. However, when the rubber sheet 4 is arranged at each side of the overlap portion 2 as shown in FIG. 5 without being located on the outer face of the overlap portion 2 or between the edge portions to be overlapped, the improving effect of the uneven appearance can not be obtained.

According to the method of the invention, the rubber sheet is attached to the overlap portion of the carcass material and then tread rubber and the like are attached thereonto to form a green tire, and thereafter the green tire is cured in a vulcanizer to obtain a radial tire product according to the invention.

In the invention, the rubber sheet is required to have a thickness of not more than 1.5 mm, preferably 1.0 mm. When the thickness exceeds 1.5 mm, the concave quantity becomes small, but the rubber quantity in the vicinity of the bead portion at the overlap portion of the carcass material becomes too large, and consequently there are caused problems such as bead deformation, difficulty of rim assembling and the like. On the other hand, when it is less than 0.3 mm, the effect is very small. Therefore, the thickness of the rubber sheet is within a range of 0.3–1.5 mm, preferably 0.3–1.0 mm.

According to the invention, the width of the rubber sheet is required to be within a range of 5–80 mm. When the width is less than 5 mm, the overlap portion of the carcass material can not sufficiently be covered and also the operability is poor to lower the productivity. When it exceeds 80 mm, the rubber quantity at the overlap portion becomes too large, and consequently tire uniformity is degraded.

Further, in the invention, the tensile modulus at 100% elongation of the rubber sheet after the vulcanization is restricted to not more than 80 kg/cm$^2$. When it exceeds 80 kg/cm$^2$, the improving effect of unevenness is less. Moreover, when the tensile modulus is less than 10 kg/cm$^2$, there is improved effect of unevenness, but the handling property of the rubber sheet is poor, so that such a rubber is unsuitable for practical use. Therefore, the tensile modulus is within a range of 10–80 kg/cm$^2$, preferably 20–60 kg/cm$^2$.

The following examples are given in illustration of the invention and are not intended as limitations thereof.

Various radial test tires having a tire size of P195/75 R14 were prepared by arranging an unvulcanized rubber sheet as shown in the following Table 1 onto an outer face of an overlap portion of a carcass material or between opposed edge portions of the carcass material to be overlapped to form a green tire and then vulcanizing the resulting green tire. Then, the unevenness at sidewall face, tire uniformity, shape of bead portion and total evaluation were made with respect to these test tires under the following conditions.

| rim | 5.5J × 1.4 |
|---|---|
| internal pressure | 2.0 kg/cm$^2$ |
| revolution number of tire | 12 rpm |

Figure 6:
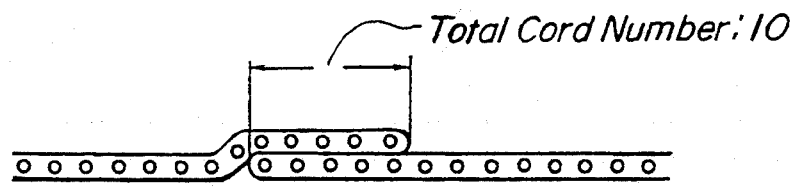
FIG. 6 is a schematically partial sectional view showing an overlap portion of a carcass material in a radial tire used in Examples.

Moreover, each of the above test tires was prepared so that the total number of cords at the overlap portion of the carcass material was 10 (see FIG. 6).

The concave and convex quantities at sidewall face, uniformity and bead portion shape were concretely measured as follows.

Measurement of concave and Convex Quantities

Figure 7:
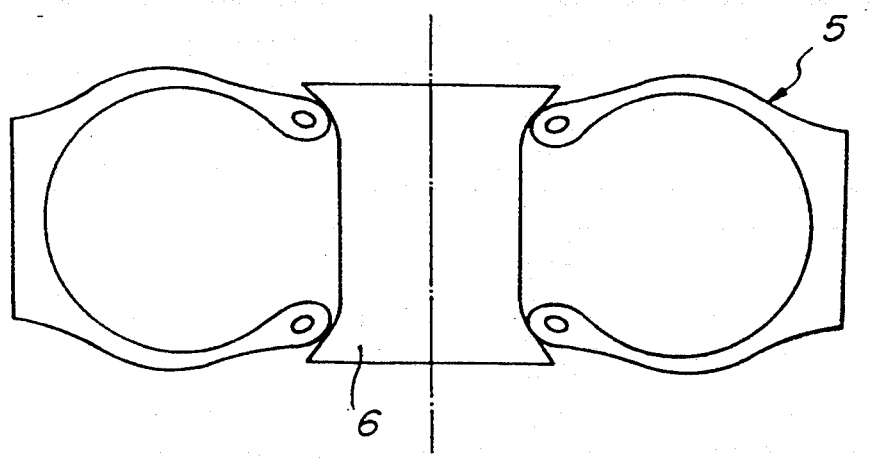
FIG. 7 is a schematic view showing the measurement of concave and convex quantities.

The test tire was fixed to a rim 6 as shown in FIG. 7 and inflated under a normal internal pressure. Then, a tip of a dial gauge for detecting unevenness was pushed onto a smooth measuring portion having no letter or the like in the periphery of the sidewall portion of the tire and fixed thereto. Thereafter, the movement of the tip of the dial gauge was converted into electrical signals to record the unevenness at the sidewall face onto a recording paper through an automatic recorder. An example of concave and convex quantities recorded is shown in FIGS. 8a and 8b. When the concave and convex quantities exceed 0.5 mm, there may be caused the claiming of the appearance in the market, so that the unevenness of not more than 0.5 mm is judged as a good appearance in this example. In Table 1, the unevenness was evaluated when 0.1 mm is one point and concave side is − and convex side is +. Therefore, the appearance is unfavorable outside the range of ±5 points in the invention.

Measurement of Uniformity

Uniformity was measured according to a method of JASO C607-74. That is, the tire was loaded on a cornering test machine and rotated at a state that the cornering radius was constant, whereby the load was varied. This varied quantity (total amplitude) was called as a radial force variation (RFL). Such an RFL value was measured. The uniformity was evaluated by the following level when the RFL value of Comparative Example 2 was standard.

⊚: not more than 10%
○: 11–20%
Δ: 21–30%
×: more than 31%

Measurement of Bead Portion Shape

It was evaluated by feeling according the following standard:

⊚: There is substantially no deformation of bead core, i.e. no partial bulging deformation inward of the tire is caused by the increase of rubber quantity.

○: The shape of bead core is good, but the bulging deformation inward the tire due to the increase of rubber quantity is observed.

Δ: The shape of bead core is somewhat poor, and the bulging inward the tire is caused due to the increase of rubber quantity and further the rim assembling is difficult.

The evaluation results are also shown in Table 1. Moreover, as the arrangement of rubber sheet, A to D correspond to FIGS. 3a to 3d, and E corresponds to FIG. 5, and (I) and (II) correspond to FIGS. 1 and 2, respectively.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Arrangement of rubber sheet | A-(I) | A-(I) | A-(I) | A-(I) | A-(I) | none | A-(I) | B-(I) |
| Thickness of rubber sheet (mm) | 0.3 | 0.6 | 0.9 | 1.5 | 1.7 | — | 1.7 | 1.7 |
| Width of rubber sheet (mm) | 60 | 60 | 60 | 60 | 60 | — | 30 | 7 |
| Tensile modulus at 100% elongation (kg/cm$^2$) | 25 | 25 | 25 | 25 | 25 | — | 25 | 25 |
| Unevenness at sidewall face | −4.5 | −3.0 | −1.0 | +4.0 | +7.0 | −11.0 | +7.0 | +7.0 |
| Tire uniformity | ⊚ | ⊚ | ⊚ | ○ | Δ | ⊚ | ○ | ○ |
| Shape of bead portion | ⊚ | ⊚ | ⊚ | ○ | Δ | ⊚ | Δ | Δ |
| Total evaluation *1 | ○ | ⊚ | ⊚ | ○ | × | × | × | × |

|  | Example 5 | Example 6 | Example 7 | Example 8 | Example 9 | Comparative Example 5 | Comparative Example 6 | Example 10 |
|---|---|---|---|---|---|---|---|---|
| Arrangement of rubber sheet | A-(I) | A-(I) | A-(I) | A-(I) | A-(I) | A-(I) | A-(I) | A-(I) |
| Thickness of rubber sheet (mm) | 0.6 | 0.6 | 0.6 | 0.6 | 0.6 | 0.6 | 0.6 | 0.6 |

TABLE 1-continued

| | | | | | | | | |
|---|---|---|---|---|---|---|---|---|
| Width of rubber sheet (mm) | 5 | 10 | 30 | 50 | 80 | 100 | 120 | 60 |
| Tensile modulus at 100% elongation (kg/cm²) | 25 | 25 | 25 | 25 | 25 | 25 | 25 | 15 |
| Unevenness at sidewall face | −4.5 | −3.5 | −2.5 | −3.0 | −3.5 | −4.0 | −4.0 | −2.0 |
| Tire uniformity | ⊚ | ⊚ | ⊚ | ⊚ | ○ | Δ | X | ⊚ |
| Shape of bead portion | ⊚ | ⊚ | ⊚ | ⊚ | ⊚ | ⊚ | ⊚ | ⊚ |
| Total evaluation *1 | ○ | ⊚ | ⊚ | ⊚ | ○ | ○ | X | ⊚ |

| | Example 11 | Example 12 | Example 13 | Example 14 | Comparative Example 7 | Example 15 | Example 16 | Example 17 |
|---|---|---|---|---|---|---|---|---|
| Arrangement of rubber sheet | A-(I) | A-(I) | A-(I) | A-(I) | A-(I) | A-(II) | A-(II) | B-(I) |
| Thickness of rubber sheet (mm) | 0.6 | 0.6 | 0.6 | 0.6 | 0.6 | 0.6 | 0.6 | 0.6 |
| Width of rubber sheet (mm) | 60 | 60 | 60 | 60 | 60 | 60 | 30 | 6 |
| Tensile modulus at 100% elongation (kg/cm²) | 30 | 12 | 50 | 75 | 90 | 25 | 25 | 25 |
| Unevenness at sidewall face | −2.5 | −1.5 | −3.0 | −4.0 | −8.0 | −3.0 | −3.0 | −3.5 |
| Tire uniformity | ⊚ | ⊚ | ⊚ | ⊚ | ⊚ | ⊚ | ⊚ | ⊚ |
| Shape of bead portion | ⊚ | ⊚ | ⊚ | ○ | Δ | ⊚ | ⊚ | ⊚ |
| Total evaluation *1 | ⊚ | ⊚ | ⊚ | ⊚ | X | ⊚ | ⊚ | ⊚ |

| | Example 18 | Example 19 | Comparative Example 8 | Comparative Example 9 | Comparative Example 10 |
|---|---|---|---|---|---|
| Arrangement of rubber sheet | C-(I) | D | E-(I) | E-(I) | E-(I) |
| Thickness of rubber sheet (mm) | 0.6 | 0.6 | 0.6 | 0.6 | 0.3 |
| Width of rubber sheet (mm) | 60 | 60 | 30 mm × 2 | 30 mm × 2 | 30 mm × 2 |
| Tensile modulus at 100% elongation (kg/cm²) | 25 | 25 | 25 | 15 | 25 |
| Unevenness at sidewall face | −3.5 | −4.5 | −13.0 | −12.5 | −13.5 |
| Tire uniformity | ⊚ | ⊚ | ⊚ | ⊚ | ⊚ |
| Shape of bead portion | ⊚ | ⊚ | ⊚ | ⊚ | ⊚ |
| Total evaluation *1 | ⊚ | ○ | X | X | X |

*1 ⊚ . . . good, ○ . . . slightly good, Δ . . . slightly poor, X . . . poor

As seen from the results of Table 1, when the rubber sheet is arranged onto the outer face of the overlap portion of the carcass material or between opposed edge portions of the carcass material to be overlapped according to the method of the invention, the rubber sheet has a cushioning action, so that there is caused no problem such as bead portion deformation, difficulty of rim assembling or the like and consequently the improving effect of uneven appearance at the tire sidewall face can be obtained.

What is claimed is:

1. A method of producing a pneumatic radial tire having a carcass of at least one radial carcass ply containing rubberized organic fiber cords radially extending between a pair of bead cores through a tread portion, comprising the steps of; placing an unvulcanized rubber sheet having a width in the range of 5–80 mm, a thickness of not more than 1.5 mm and tensile modulus at 100% elongation after vulcanization of not more than 80 kg/cm² on an outer face of an overlap portion produced by first piling opposed cut edge portions of the carcass ply one upon the other and at least around said bead core, said unvulcanized rubber sheet completely covering said overlap portion, extending beyond a cut edge of said carcass ply, and containing no reinforcing cords, and then curing the assembled tire after building.

2. The method according to claim 1, wherein said rubber sheet has a thickness of 0.3–1.5 mm.

3. The method according to claim 1, wherein said rubber sheet after vulcanization has a tensile modulus at 100% elongation of 10–30 kg/cm².

4. The method according to claim 1, herein said organic fiber cord is made from polyethylene terephthalate.

5. A pneumatic radial tire manufactured by a method of claim 4.

* * * * *